(12) United States Patent
Ke

(10) Patent No.: US 12,090,393 B2
(45) Date of Patent: Sep. 17, 2024

(54) GAMEPAD AUXILIARY DEVICE

(71) Applicant: Jiating Ke, Shantou (CN)

(72) Inventor: Jiating Ke, Shantou (CN)

( * ) Notice: Subject to any disclaimer, the term of this patent is extended or adjusted under 35 U.S.C. 154(b) by 275 days.

(21) Appl. No.: 17/730,788

(22) Filed: Apr. 27, 2022

(65) Prior Publication Data

US 2023/0347237 A1 Nov. 2, 2023

(51) Int. Cl.
*A63F 13/24* (2014.01)

(52) U.S. Cl.
CPC .................................... *A63F 13/24* (2014.09)

(58) Field of Classification Search
CPC .................................. A63F 13/24; A63F 13/98
See application file for complete search history.

(56) References Cited

U.S. PATENT DOCUMENTS

| | | | | |
|---|---|---|---|---|
| 10,232,254 | B2 * | 3/2019 | Gassoway | A63F 13/98 |
| 10,252,173 | B2 * | 4/2019 | Dornbusch | A63F 13/23 |
| 10,272,325 | B1 * | 4/2019 | Nevarez | A63F 13/98 |
| 10,905,948 | B1 * | 2/2021 | Nevarez | G06F 3/0393 |
| 11,103,796 | B1 * | 8/2021 | McDonell | E05B 73/0082 |
| 11,413,522 | B1 * | 8/2022 | Hodrinsky | A63F 13/24 |
| 2010/0298053 | A1 * | 11/2010 | Kotkin | A63F 13/98 |
| | | | | 463/37 |
| 2011/0059796 | A1 * | 3/2011 | Kondo | A63F 13/28 |
| | | | | 463/31 |
| 2012/0244944 | A1 * | 9/2012 | Kotkin | A63F 13/24 |
| | | | | 463/37 |
| 2016/0317919 | A1 * | 11/2016 | Gassoway | A63F 13/245 |
| 2017/0354895 | A1 * | 12/2017 | Dornbusch | A63F 13/30 |
| 2020/0330858 | A1 * | 10/2020 | Hodrinsky | A63F 13/98 |

FOREIGN PATENT DOCUMENTS

| | | | | |
|---|---|---|---|---|
| EP | 3156109 | A2 * | 4/2017 | A63F 13/21 |
| JP | 6640408 | B1 * | 2/2020 | A45C 11/00 |

OTHER PUBLICATIONS

JP6640408 text translation (Year: 2020).*

* cited by examiner

*Primary Examiner* — Peter J Iannuzzi
(74) *Attorney, Agent, or Firm* — Li & Cai Intellectual Property (USA) Office

(57) ABSTRACT

A gamepad auxiliary device relating to the field of gamepad auxiliary technology is provided, comprising: an assembly part for arranging on a gamepad and covering at least a portion of the gamepad; and at least one operating rod, of which one end is a tapping end, another end is an operating end, and a middle part is assembled on the assembly part through a fulcrum; wherein when the gamepad auxiliary device is assembled on the gamepad, the tapping end extends to an upper side of the button of the gamepad, and the operating end extends to a front and lower side of the gamepad, and is located between two grips of the gamepad; wherein when an operator uses the middle finger, the ring finger or the little finger to touch the operating end to an outside, the tapping end is pressed down to tap the button of the gamepad.

8 Claims, 9 Drawing Sheets

GAMEPAD AUXILIARY DEVICE

FIELD OF THE DISCLOSURE

The present disclosure relates to the field of gamepad auxiliary technology, in particular, to a gamepad auxiliary device.

BACKGROUND OF THE DISCLOSURE

A gamepad is a component of a common electronic game console, which controls the virtual characters of the game by manipulating its buttons. The standard configuration of the gamepad is established and implemented by Nintendo, which includes: three control buttons of cross button (direction), ABXY function button (action—also marked by hardware manufacturers in different ways, but the arrangement is roughly the same), and selection and pause button (menu). With the upgrading of game equipment hardware, modern gamepads, analog joysticks (direction and angle of view), trigger buttons, and HOME menu buttons, have been added.

The limitations of the human hand require the user to release some buttons or keys to actuate other buttons or keys, which can impair the user's ability to maximize the game play and can also lead to devastating repeated use injuries or medical conditions.

Therefore, there is a need for an accessory for gamepads that cooperates with existing gamepads to provide users with enhanced functionality and less stress on the user's hands.

SUMMARY OF THE DISCLOSURE

The purpose of the present disclosure is to aim at the defects and deficiencies of the prior art, to provide gamepad auxiliary device which has the advantages that more fingers can be used to assist the operation, helping the operator to perform faster operations, and also reducing the pressure on the operator's thumb.

In order to achieve the above object, the technical solution adopted in the present disclosure is to provide a gamepad auxiliary device, comprising: an assembly part for arranging on a gamepad and covering at least a portion of the gamepad; and at least one operating rod, of which one end is a tapping end, another end is an operating end, and a middle part is assembled on the assembly part through a fulcrum; wherein when the gamepad auxiliary device is assembled on the gamepad, the tapping end extends to an upper side of a button of the gamepad, and the operating end extends to a front and lower side of the gamepad, and is located between two grips of the gamepad; and wherein when an operator uses the middle finger, the ring finger or the little finger to touch the operating end to an outside, the tapping end is pressed down to tap the button of the gamepad.

In preferred embodiments of the present disclosure, the fulcrum is arranged on a side toward the tapping end.

In preferred embodiments of the present disclosure, a limiting ring that is closed and fastened on the operating rod is provided on a portion of the assembly part near the tapping end, and the limiting ring provides a space for the tapping end to be pressed down and is configured to limit the tapping end from shifting the button of the gamepad.

In preferred embodiments of the present disclosure, the limiting ring is n-shaped.

In preferred embodiments of the present disclosure, a number of the operating rod is provided and the operating rod is close to a left grip of the gamepad, and a space is provided between the operating rod and the left grip for the operating end to move to a left side to drive the tapping end to move.

In preferred embodiments of the present disclosure, a number of the operating rod is two, one of the operating rod is close to a right grip of the gamepad, and a space is provided between the operating rod and the right grip for the operating end to move to a right side to drive the tapping end to move.

In preferred embodiments of the present disclosure, two operating rods are provided and one of the two operating rods is close to a left grip of the gamepad, and a space is provided between the operating rod and the left grip for the operating end to move to a left side to drive the tapping end to move; another one of the two operating rods is close to a right grip of the gamepad, and a space is provided between the operating rod and the right grip for the operating end to move to a right side to drive the tapping end to move.

In preferred embodiments of the present disclosure, the assembly part comprises: a face shell assembled on an upper side of the gamepad, and a bottom cover hinged on one side of the face shell and assembled on a lower side of the gamepad.

In preferred embodiments of the present disclosure, a free side of the face shell is detachably assembled with a free side of the bottom cover.

In preferred embodiments of the present disclosure, the assembly part is a face shell assembled on an upper side of the gamepad.

In preferred embodiments of the present disclosure, an inner side of the assembly part is provided with a convex point corresponding to a sound outlet hole of the gamepad.

In the present disclosure, the assembly part is arranged on the gamepad, the operating end is arranged on the assembly part, the tapping end of the operating rod extends to the upper side of the button of the gamepad, and the operating end extends to the front and the lower side of the gamepad and is located between two grips of the gamepad, so that after the gamepad auxiliary device is assembled on the gamepad, the operator can use the middle finger, ring finger or little finger to touch the operating end of the operating rod to the outside, and the tapping end depresses and taps the button of the gamepad to embody the control of the button of the gamepad, that is, more fingers can be used to assist the operation, helping the operator to perform faster operations, and reducing the pressure on the operator's thumb.

BRIEF DESCRIPTION OF THE DRAWINGS

In order to illustrate the embodiments of the present disclosure or the technical solutions in the prior art more clearly, the following briefly introduces the accompanying drawings that are used in the description of the embodiments or the prior art. Obviously, the drawings in the following description are only some embodiments of the present disclosure. For those of ordinary skill in the art, other drawings can also be obtained based on these drawings without any creative effort.

DETAILED DESCRIPTION OF THE EXEMPLARY EMBODIMENTS

The present disclosure will be further described in detail below with reference to the accompanying drawings.

This specific embodiment is only an explanation of the present disclosure, and it is not a limitation of the present disclosure. Those skilled in the art can make modifications to this embodiment without creative contribution as needed after reading this specification, and as long as the rights of the present disclosure are used, all claims are protected by patent law.

Figure 1:
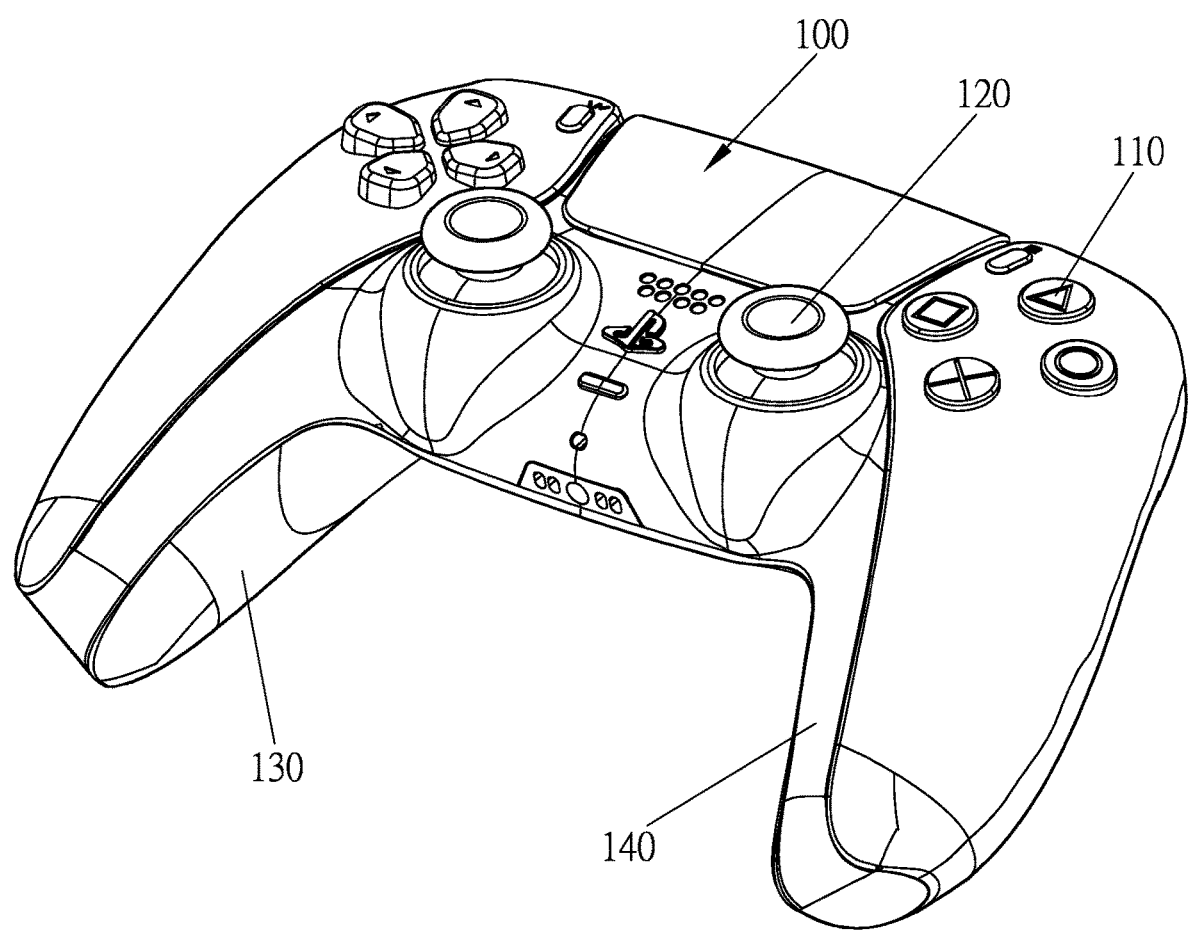
FIG. 1 is a schematic diagram of the gamepad.

FIG. 1 is a schematic structural diagram of a gamepad 100. The gamepad 100 is provided with s button 110 and a joystick 120, as well as a left grip 130 and a right grip 140.

Embodiment 1

Figure 2:
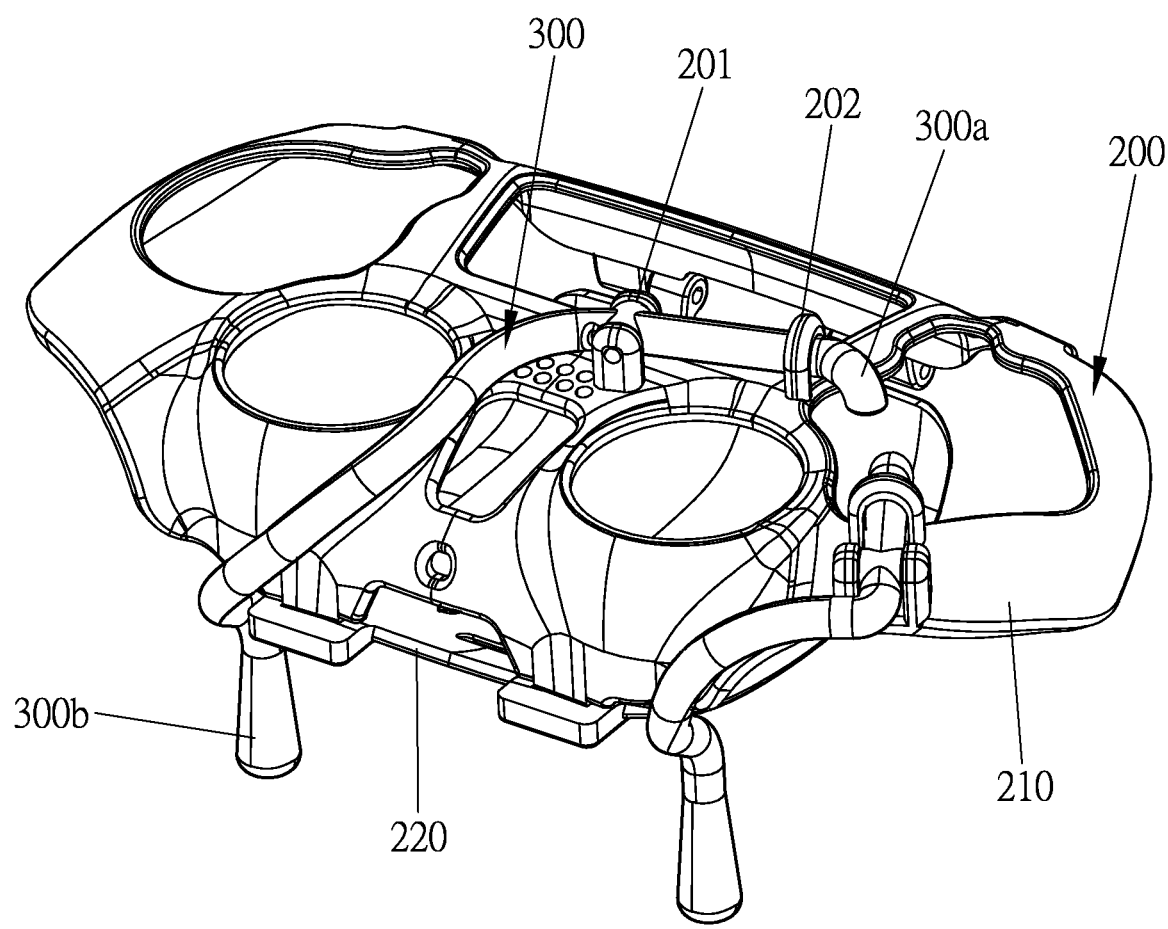
FIG. 2 is a schematic structural diagram of a gamepad auxiliary device in Embodiment 1.
Figure 3:
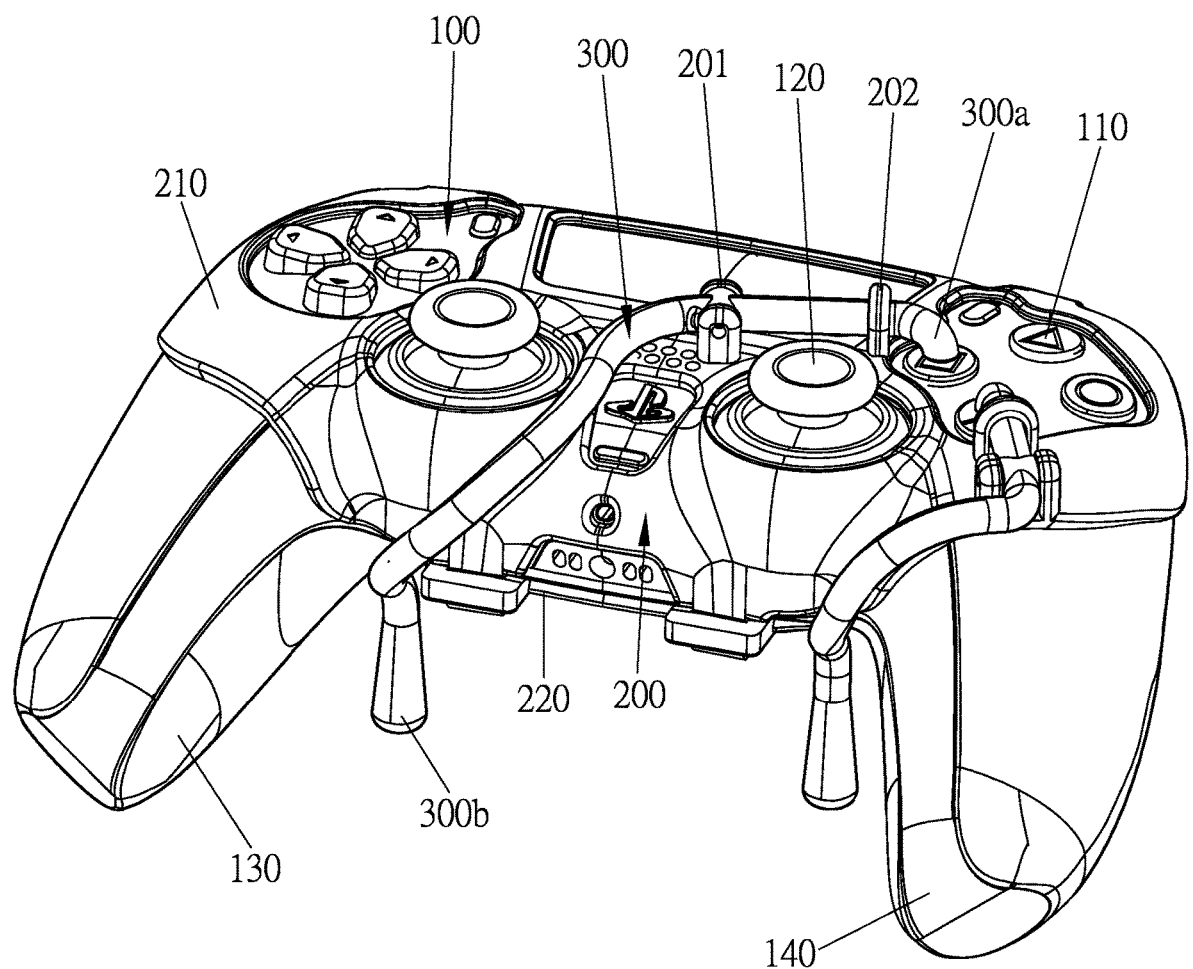
FIG. 3 is a schematic structural diagram that the gamepad auxiliary device is assembled on the gamepad in Embodiment 1.

Please refer to FIG. 2 and FIG. 3. This embodiment relates to a gamepad auxiliary device, including an assembly part 200 and at least one operating rod 300. The assembly part 200 can also be considered as the skin of the gamepad 100, and the operating rod 300 can be considered as a rod. Specifically, the assembly part 200 is used to be assembled on the gamepad 100 and cover at least a part of the gamepad 100. One end of the operating rod 300 is the tapping end 300*a*, the other end of the operating rod 300 is the operating end 300*b*, and the middle part is assembled on the assembly part 200 through the fulcrum 201.

When the gamepad auxiliary device is assembled on the gamepad 100, the tapping end 300*a* extends to the upper side of the button 110 of the gamepad 100, and the operating end 300*b* extends to the front and lower side of the gamepad 100, and is located between at the left grip 130 and the left grip 140 of the gamepad 100. After the gamepad auxiliary device is assembled on the gamepad 100, when the operator touches the operating end 300*b* with the middle finger, the ring finger or the little finger outward and slightly upward (i.e., the side facing the operator), the tapping end 300*a* will press down and tap the button 110 of the gamepad 100 to control the button 110 of the gamepad 100, that is, more fingers can be used to assist the operation, helping the operator to perform faster operations, and reducing the pressure on the operator's thumb.

In addition, in this embodiment, the fulcrum 201 is set on the side of the tapping end 300*a*, so that the operating rod 300 is tilted toward the tapping end 300*a* in a normal state, and will not touch the button 110 on the lower side of the tapping end 300*a* or only lightly touch the button 110 on the lower side of the tapping end 300*a*. Of course, in other embodiments, the fulcrum 201 may also be set between the tapping end 300*a* and the operating end 300*b*, or may be biased toward the operating end 300*b*.

As a preferred solution, a limiting ring 202 that is closed and fastened to the operating rod 300 is provided on the assembly part 200 near the tapping end 300*a*, and the limiting ring 202 has a space for the tapping end 300*a* to be pressed down. By setting the limiting ring 202, the tapping end 300*a* will not be displaced from the button 110 of the gamepad 100, thereby improving the operation accuracy. In this embodiment, the limiting ring 202 is n-shaped, and in other embodiments, other limiting structures may also be used.

In this embodiment, two operating rods 300 are provided and one of the two operating rods 300 is close to a left grip 130 of the gamepad 100, and a space is provided between the operating rod 300 and the left grip 130 for the operating end 300*b* to move to a left side to drive the tapping end 300*a* to move; another one of the two operating rods 300 is close to a right grip 140 of the gamepad 100, and a space is provided between the operating rod 300 and the right grip 140 for the operating end 300 to move to a right side to drive the tapping end 300*a* to move. Since there are two operating rods 300, the operator can control one button 110 with the middle, ring or little finger of the left hand, and control the other button 110 with the middle, ring or little finger of the right hand.

In the present embodiment, the left joystick 300 bends around between the two joysticks 120 of the gamepad 100; the right joystick 300 wraps around from the outside of the right joystick 120.

As a preferred solution, in this embodiment, the assembly part 200 includes: a face shell 210 assembled on the upper side of the gamepad 100, and a bottom cover 220 hinged on one side of the face shell 210 and assembled on the lower side of the gamepad 100. Due to the face shell 210 and the bottom cover 220, the gamepad auxiliary device can be assembled on the gamepad 100 more securely. Further, a free side of the face shell 210 is detachably assembled with a free side of the bottom cover 220. In this embodiment, the free side of the face shell 210 and the free side of the bottom cover 220 are detachably fastened. In other embodiments, magnetic attraction and other methods may also be used.

In addition, the assembly part 200 is provided with a plurality of avoidance holes to avoid the buttons 110, the joystick 120, the charging port and the like on the gamepad 100.

Embodiment 2

Figure 4:
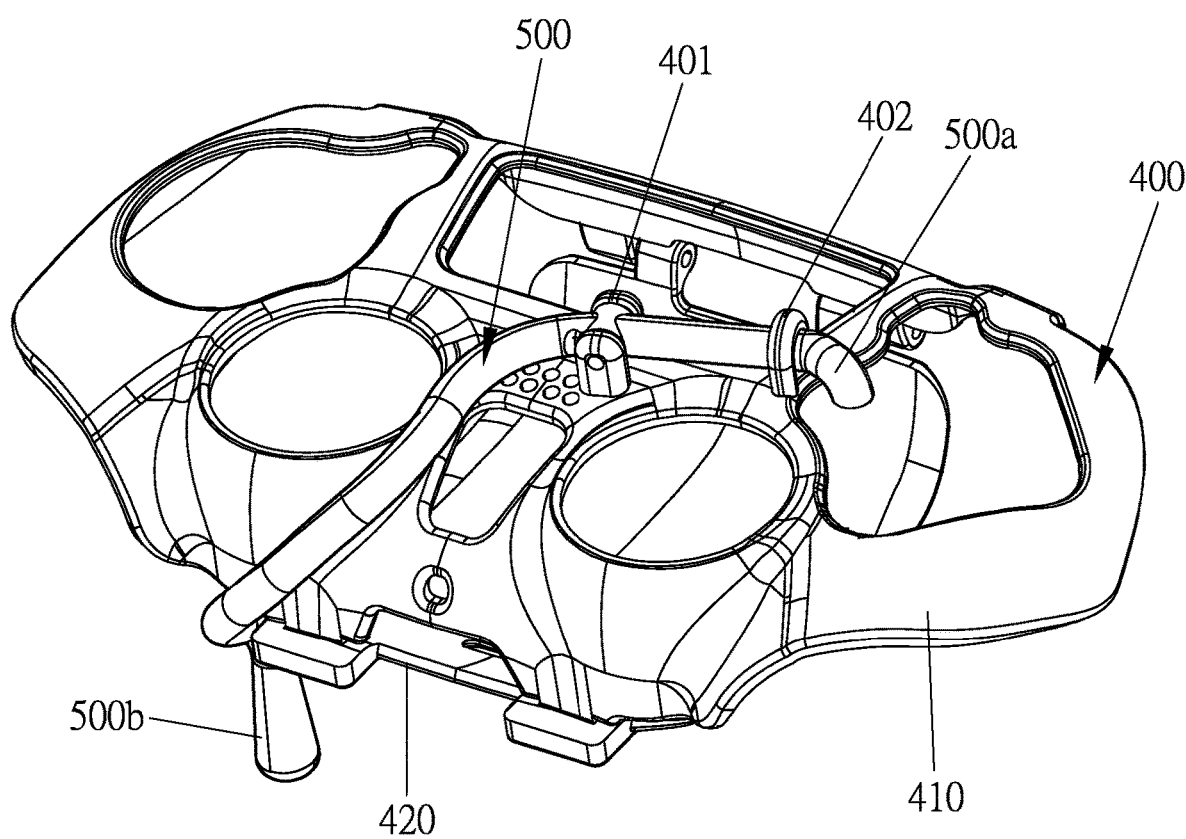
FIG. 4 is a schematic structural diagram of the gamepad auxiliary device in Embodiment 2.
Figure 5:
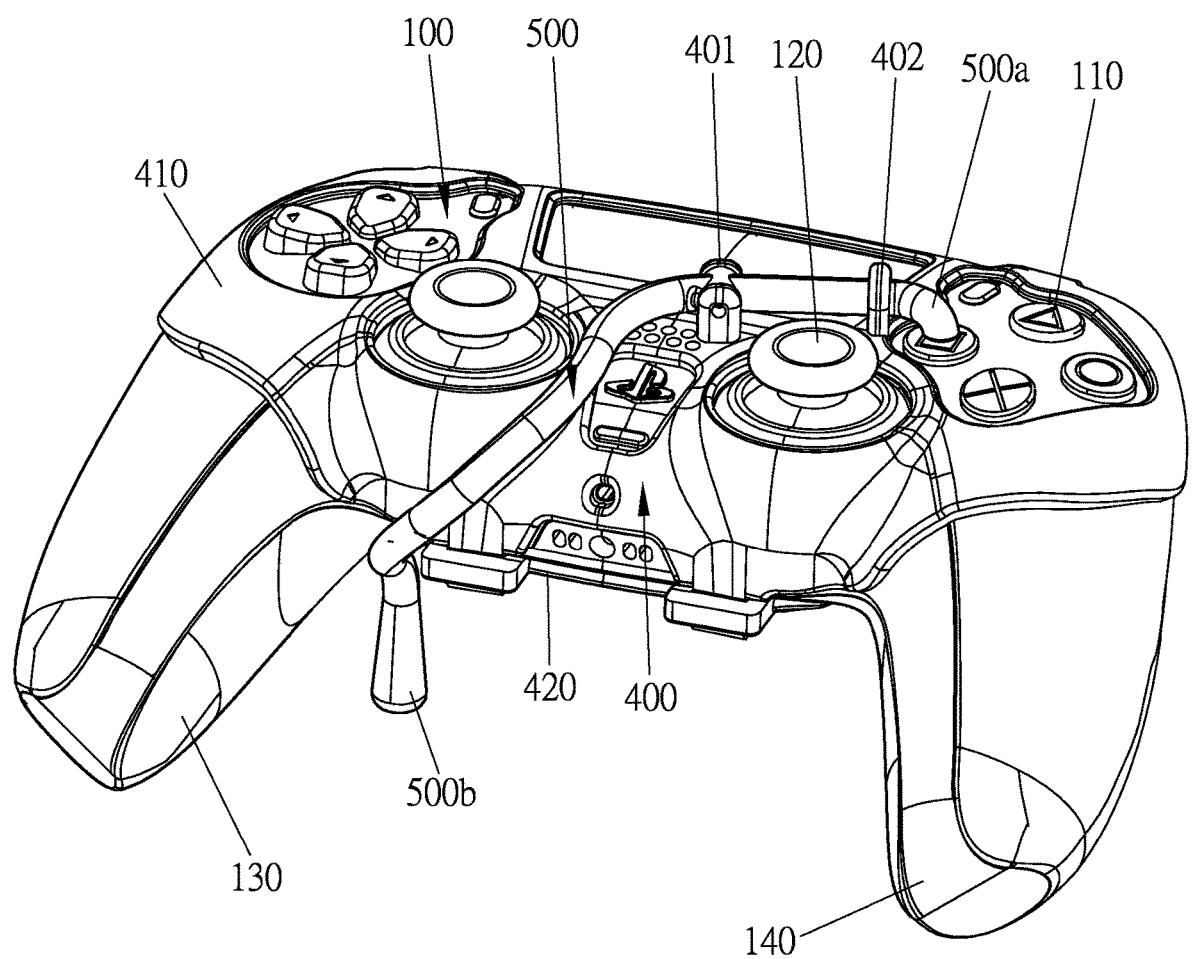
FIG. 5 is s schematic structural diagram that the gamepad auxiliary device is assembled on the gamepad in Embodiment 2.

Referring to FIG. 4 and FIG. 5, the present embodiment relates to a gamepad auxiliary device, including an assembly part 400 and at least one operating rod 500. The assembly part 400 can also be considered as the skin of the gamepad 100, and the operating rod 500 can be considered as a lever. Specifically, the assembly part 400 is used to be assembled on the gamepad 100 and cover at least a part of the gamepad 100. One end of the operating rod 500 is the tapping end 500*a*, the other end of the operating rod 500 is the operating end 500*b*, and the middle part is assembled on the assembly part 400 through the fulcrum 401.

When the gamepad auxiliary device is assembled on the gamepad 100, the tapping end 500*a* extends to the upper side of the button 110 of the gamepad 100, and the operating end 500*b* extends to the front and lower side of the gamepad 100, and is located between at the left grip 130 and the left grip 140 of the gamepad 100. After the gamepad auxiliary device is assembled on the gamepad 100, when the operator touches the operating end 500*b* with the middle finger, the tapping end 500*a* will press down and tap the button 110 of the gamepad 100, so as to embody the control of the button 110 of the gamepad 100, that is, more fingers can be used to assist the operation, helping the operator to perform a faster operation, and reducing the pressure of the operator's thumb.

In addition, in this embodiment, the fulcrum 401 is arranged on the side of the tapping end 500a, so that the operating rod 500 is tilted to the tapping end 500a in a normal state, and will not touch the button 110 on the lower side of the tapping end 500a or only lightly touch the button 110 on the lower side of the tapping end 500a. Of course, in other embodiments, the fulcrum 401 may also be set between the tapping end 500a and the operating end 500b, or may be biased toward the operating end 500b.

As a preferred solution, a limiting ring 402 closed and fastened to the operating rod 500 is provided on the assembly part 400 near the tapping end 500a, and the limiting ring 402 has a space for the tapping end 500a to be pressed down. By setting the limiting ring 402, the tapping end 500a will not be displaced from the button 110 of the gamepad 100, and the operation accuracy is improved. In this embodiment, the limiting ring 402 is n-shaped, and in other embodiments, other limiting structures may also be used.

In this embodiment, the operating rod 500 is one, and is close to the left grip 130 of the gamepad 100. A space is provided between the operating rod 500 and the left grip 130 for the operating end 500b to move to the left to drive the tapping end 500a to move. The operator can control a button 110 with the middle or ring or little finger of the left hand.

In this embodiment, the operating rod 500 is bent around between the two joysticks 120 of the gamepad 100.

As a preferred solution, in this embodiment, the assembly part 400 includes: a face shell 410 assembled on the upper side of the gamepad 100, and a bottom cover 420 hinged on one side of the face shell 410 and assembled on the lower side of the gamepad 100. Due to the face shell 410 and the bottom cover 420, the gamepad auxiliary device can be assembled on the gamepad 100 more securely. Further, the free side of the face shell 410 can be detachably assembled with the free side of the bottom cover 420. In this embodiment, the free side of the face shell 410 and the free side of the bottom cover 420 are detachably fastened. In other embodiments, magnetic attraction and the like may also be used.

In addition, the assembly part 400 is provided with a plurality of avoidance holes to avoid the button 110, the joystick 120, the charging port and the like on the gamepad 100.

Embodiment 3

Figure 6:
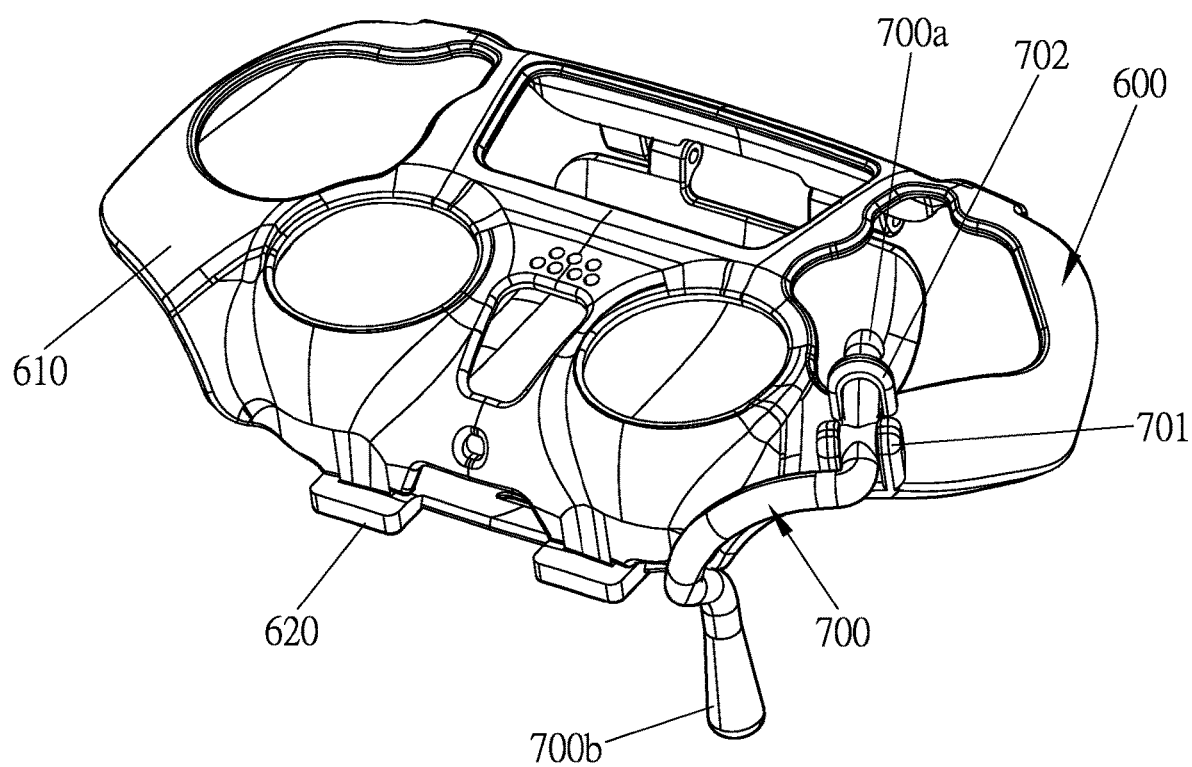
FIG. 6 is a schematic structural diagram of the gamepad auxiliary device in Embodiment 3.
Figure 7:
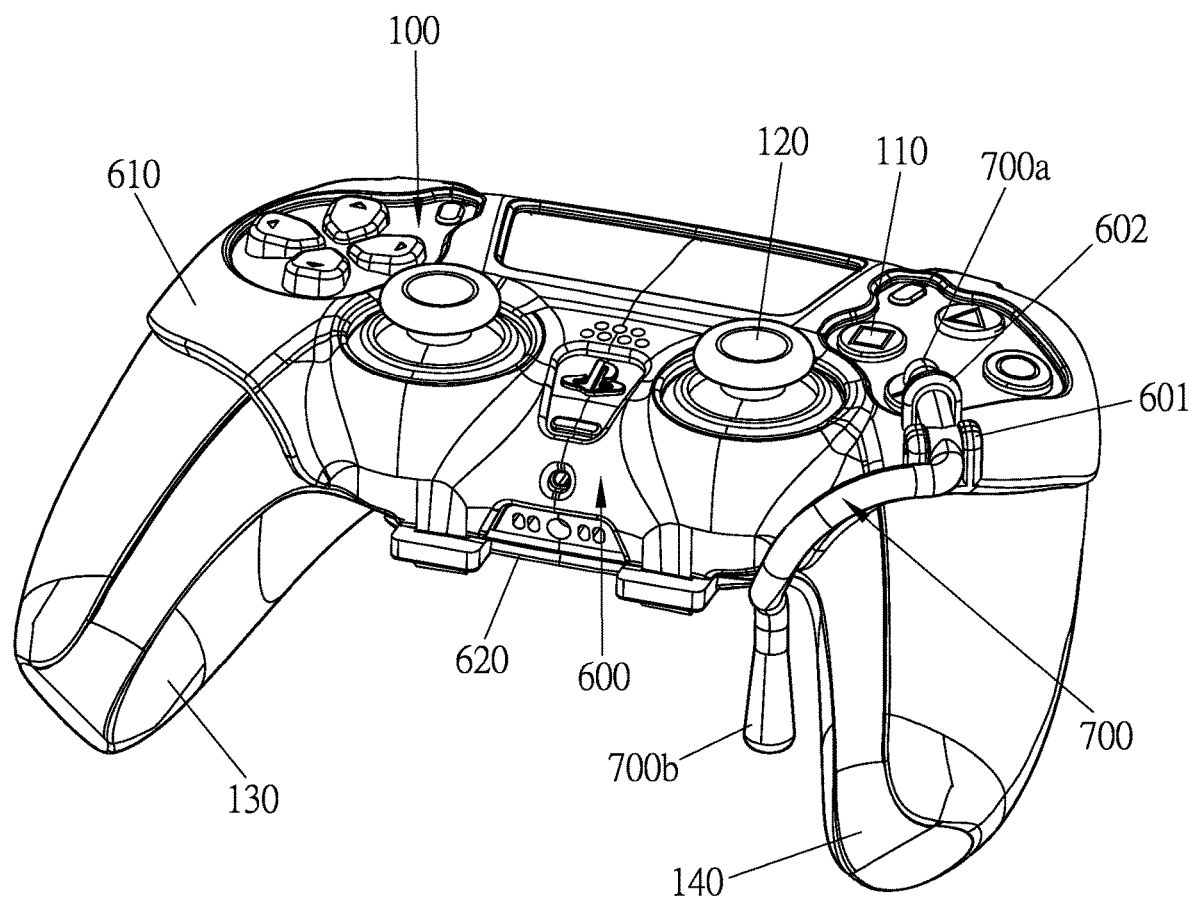
FIG. 7 is a schematic structural diagram that the gamepad auxiliary device is assembled on the gamepad in Embodiment 3.

Please refer to FIG. 6 and FIG. 7. This embodiment relates to a gamepad auxiliary device, including an assembly part 600 and at least one operating rod 700. The assembly part 600 can also be considered as the skin of the gamepad 100, and the operating rod 700 can be considered as a lever. Specifically, the assembly part 600 is used to be assembled on the gamepad 100 and covers at least a part of the gamepad 100. Specifically, the assembly part 600 is used to be assembled on the gamepad 100 and cover at least a part of the gamepad 100. One end of the operating rod 700 is the tapping end 700a, the other end of the operating rod 700 is the operating end 700b, and the middle part is assembled on the assembly part 600 through the fulcrum 601.

When the gamepad auxiliary device is assembled on the gamepad 100, the tapping end 700a extends to the upper side of the button 110 of the gamepad 100, and the operating end 700b extends to the front and lower side of the gamepad 100, and is located between the left grip 130 and the right grip 140 of the gamepad 100. After the gamepad auxiliary device is assembled on the gamepad 100, when the operator touches the operating end 700b with the middle finger, the ring finger or the little finger to the outside and slightly upward, the tapping end 700a will press down the button 110 of the gamepad 100, thereby embodying the control of the button 110 of the gamepad 100; that is, more fingers can be used to assist the operation, helping the operator to perform a faster operation, and also reducing the pressure on the operator's thumb.

In addition, in this embodiment, the fulcrum 601 is arranged on the side of the tapping end 700a, so that the operating rod 700 is tilted toward the tapping end 700a in a normal state, and will not touch the button 110 on the lower side of the tapping end 700a or only lightly touch the button 110 on the lower side of the tapping end 700a. Of course, in other embodiments, the fulcrum 601 may also be set between the tapping end 700a and the operating end 700b, or may be biased toward the operating end 700b.

As a preferred solution, a limiting ring 602 that is closed and fastened to the operating rod 700 is provided on the assembly part 600 near the tapping end 700a, and the limiting ring 602 has a space for the tapping end 700a to be pressed down. By setting the limiting ring 602, the tapping end 700a will not deviate from the button 110 of the gamepad, and the operation accuracy is improved. In this embodiment, the limiting ring 602 is n-shaped, and in other embodiments, other limiting structures may also be used.

In this embodiment, a number of the operating rod 700 is provided and the operating rod 700 is close to a right grip 140 of the gamepad 100, and a space is provided between the operating rod 700 and the right grip 140 for the operating end 700b of the operating rod 700 to move to a right side to drive the tapping end 700a to move. The operator can control a button 110 with the middle or ring or little finger of the right hand.

In this embodiment, the operating rod 700 on the right side bypasses the outside of the joystick 120 on the right side.

As a preferred solution, in this embodiment, the assembly part 600 includes: a face shell 610 assembled on the upper side of the gamepad 100, and a bottom cover 620 hinged on one side of the face shell 610 and assembled on the lower side of the gamepad 100. Due to the face shell 610 and the bottom cover 620, the gamepad auxiliary device can be assembled on the gamepad 100 more securely. Further, the free side of the face shell 610 can be detachably assembled with the free side of the bottom cover 620. In this embodiment, the free side of the face shell 610 and the free side of the bottom cover 620 are detachably fastened. In other embodiments, magnetic attraction and the like may also be used.

In addition, the assembly part 600 is provided with a plurality of avoidance holes to avoid the button 110, the joystick 120, the charging port and the like on the gamepad 100.

Embodiment 4

Figure 8:
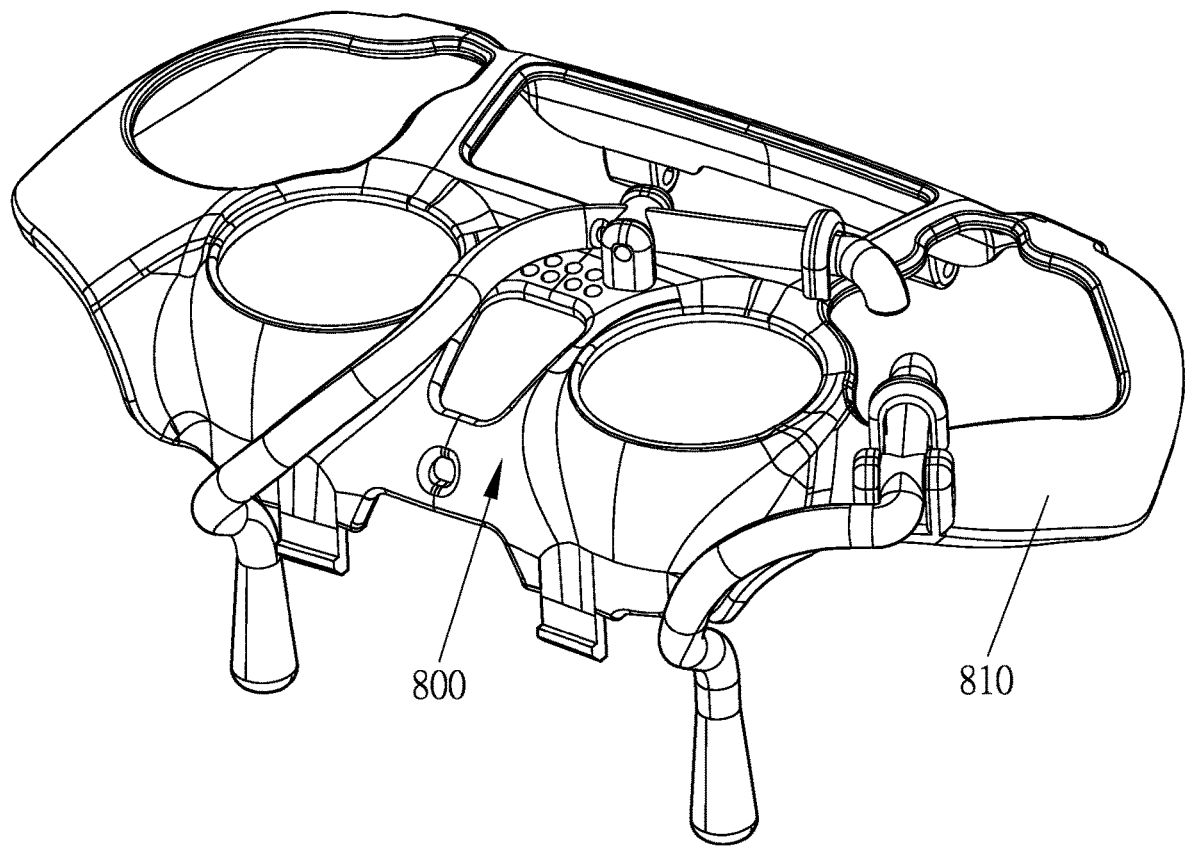
FIG. 8 is a schematic structural diagram of the gamepad auxiliary device in Embodiment 4.
Figure 9:
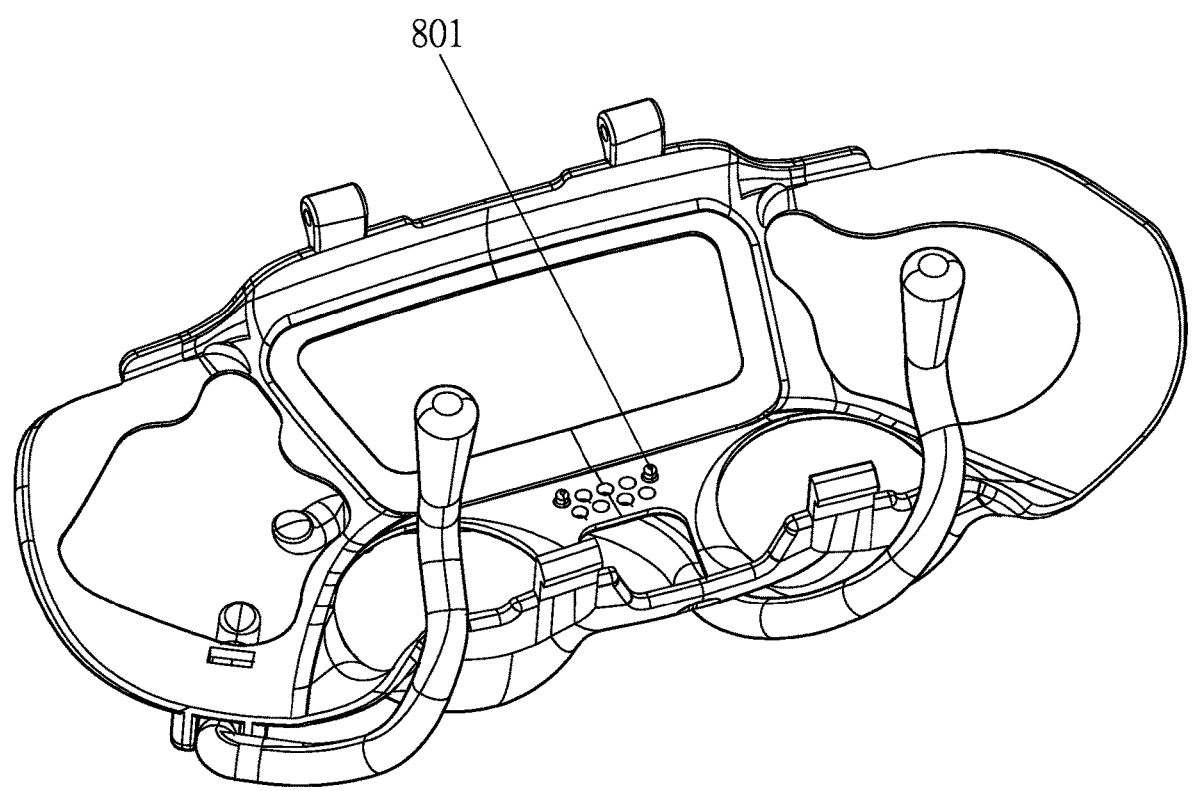
FIG. 9 is a schematic structural diagram of another perspective of the gamepad auxiliary device in Embodiment 4.

Please refer to FIG. 8 and FIG. 9. This embodiment relates to a gamepad auxiliary device. The difference from Embodiment 1 is that in this embodiment, the assembly part 800 is only assembled on the face shell 810 on the upper side of the gamepad 100.

As a preferred solution, the inner side of the face shell 810 is provided with a convex point 801 corresponding to the sound outlet hole of the gamepad 100, so that the face shell 810 can be better positioned during assembly. In this embodiment, two bumps 801 are provided corresponding to the two sound holes. In addition, in the above-mentioned Embodiments 1 to 3, bumps may also be provided on the face shell.

The working principle of the present disclosure is roughly as follows. By setting an assembly part assembled on the gamepad, and at least one operating rod is arranged on the assembly part, the tapping end of the operating rod extends to the upper side of the button of the gamepad, and the operating end extends to the upper side of the button of the gamepad. The front and lower side of the gamepad is located between the two grips of the gamepad, so that after the gamepad auxiliary device is assembled on the gamepad, the operator can use the middle finger, ring finger or little finger to touch the outside of the operating end of the joystick, and the tapping end presses down on the button of the gamepad to control the button of the gamepad, that is, more fingers can be used to assist the operation, helping the operator to perform faster operations, and also reducing the pressure on the operator's thumb.

The above is only used to illustrate the technical solution of the present disclosure and not to limit it. Other modifications or equivalent replacements made by those of ordinary skill in the art to the technical solution of the present disclosure, as long as they do not depart from the spirit and scope of the technical solution of the present invention, should be included in the within the scope of the claims of the present disclosure.

What is claimed is:

1. A gamepad auxiliary device, comprising:
   an assembly part for arranging on a gamepad and covering at least a portion of the gamepad; and
   at least one operating rod, of which one end is a tapping end, another end is an operating end, and a middle part is assembled on the assembly part through a fulcrum;
   wherein, when the gamepad auxiliary device is assembled on the gamepad, the tapping end extends to an upper side of a button of the gamepad, and the operating end extends to a front and lower side of the gamepad, and is located between two grips of the gamepad; and
   wherein, when an operator uses the middle finger, the ring finger or the little finger to touch the operating end to an outside, the tapping end is pressed down to tap the button of the gamepad,
   wherein, when a number of the operating rods is two, the two operating rods are arranged between inner edges of the two grips, one operating rod is arranged adjacent to a left grip of the gamepad, and a space is provided between the one operating rod and the left grip for the operating end to move to a left side to drive the tapping end to move; another operating rod is arranged adjacent to a right grip of the gamepad, and a space is provided between the another operating rod and the right grip for the operating end to move to a right side to drive the tapping end to move.

2. The gamepad auxiliary device according to claim 1, wherein the fulcrum is arranged on a side toward the tapping end.

3. The gamepad auxiliary device according to claim 1, wherein a limiting ring that is closed and fastened on the operating rod is provided on a portion of the assembly part near the tapping end, and the limiting ring provides a space for the tapping end to be pressed down and is configured to limit the tapping end from shifting the button of the gamepad.

4. The gamepad auxiliary device according to claim 3, wherein the limiting ring is n-shaped.

5. The gamepad auxiliary device according to claim 1, wherein the assembly part includes: a face shell assembled on an upper side of the gamepad, and a bottom cover hinged on one side of the face shell and assembled on a lower side of the gamepad.

6. The gamepad auxiliary device according to claim 5, wherein a free side of the face shell is detachably assembled with a free side of the bottom cover.

7. The gamepad auxiliary device according to claim 1, wherein the assembly part is a face shell assembled on an upper side of the gamepad.

8. The gamepad auxiliary device according to claim 1, wherein an inner side of the assembly part is provided with a convex point corresponding to a sound outlet hole of the gamepad.

* * * * *